United States Patent [19]
Fisher

[11] 3,767,299
[45] Oct. 23, 1973

[54] DISPLAY PROJECTOR
[76] Inventor: Jules Fisher, 255 W. 19th St., New York, N.Y.
[22] Filed: Oct. 20, 1971
[21] Appl. No.: 190,969

[52] U.S. Cl. .......................... 353/38, 353/1, 353/46
[51] Int. Cl. .......................................... G03b 21/28
[58] Field of Search ...................... 353/1, 2, 38, 46, 353/56, 51, 84

[56] References Cited
UNITED STATES PATENTS

| | | | |
|---|---|---|---|
| 3,609,339 | 9/1971 | Smith | 353/1 |
| 3,163,078 | 12/1964 | Elliott | 84/464 |
| 3,215,022 | 11/1965 | Orgo | 84/464 |
| 3,160,975 | 12/1964 | Malina | 353/1 |
| 3,600,076 | 8/1971 | Synder | 353/1 |
| 2,607,269 | 8/1952 | Elsaesser | 353/2 |

FOREIGN PATENTS OR APPLICATIONS

| | | | |
|---|---|---|---|
| 1,203,464 | 8/1970 | Great Britain | 353/1 |
| 1,257,721 | 2/1961 | France | 353/1 |
| 1,144,589 | 2/1963 | Germany | 353/1 |

Primary Examiner—Louis R. Prince
Assistant Examiner—A. J. Mirabito
Attorney—Joseph G. Denny et al.

[57] ABSTRACT

A visual display system comprising a laser light source, patterned display generating material mounted in a plane traversing the path of a beam of light from the source, means for continuously moving the beam from said source relative to the display generating material, and projection means for projecting images of the patterns on the display generating material onto a display surface. The display system may further include a reflector mounted in the optical path between the patterned display generating material and the laser light source, the reflector having an eccentric reflecting surface whereby, when the reflector is rotated, the beam of light from the laser source is made to traverse a circular path. The patterned display generating material may comprise a light reflective disc which is mounted for continuous rotation traverse of the path from the beam of said laser source or it may comprise a translucent material which is located between the above noted eccentric reflector and the projection means.

9 Claims, 4 Drawing Figures

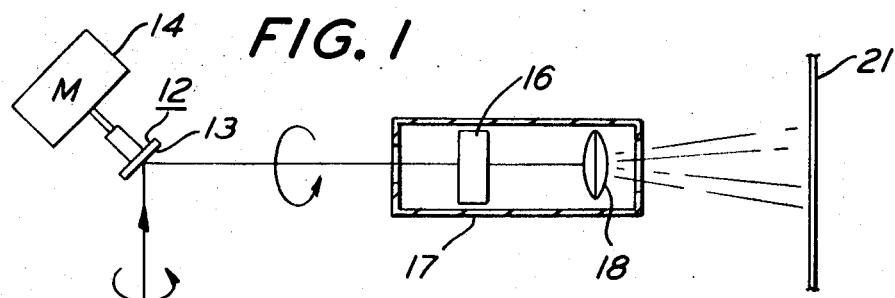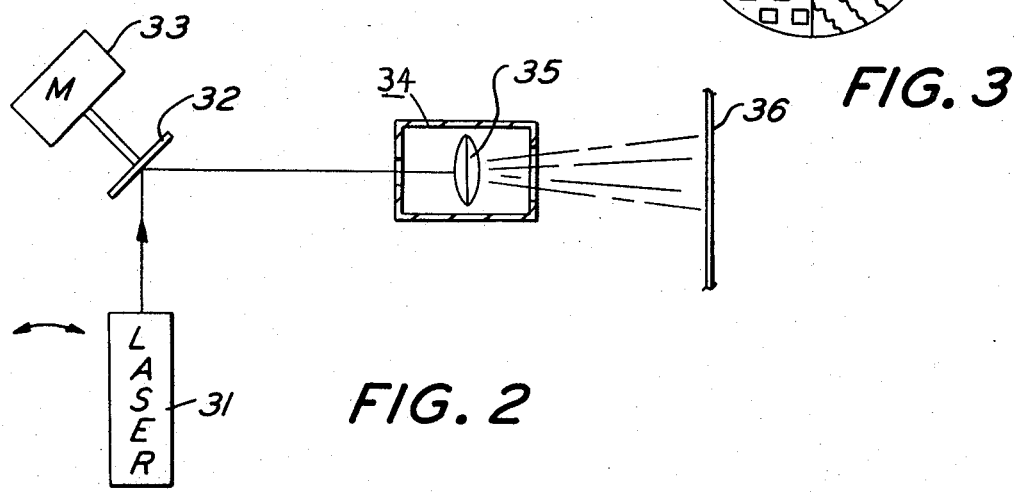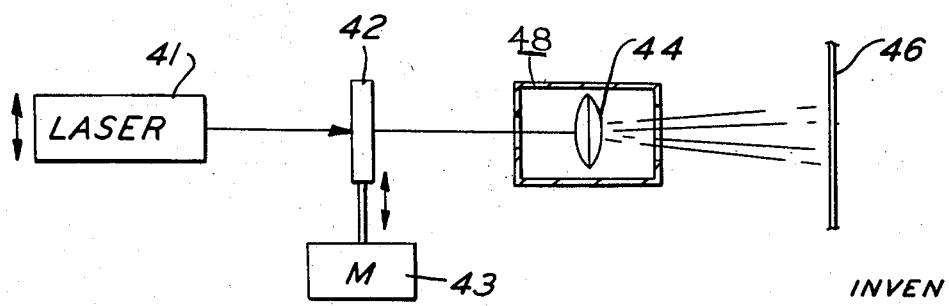

DISPLAY PROJECTOR

BACKGROUND OF THE INVENTION

This invention relates to an improved visual display system for projecting various patterns on a screen, the patterns being continuously in motion in order to create the desired aesthetic visual effect.

SUMMARY OF THE INVENTION

The primary object of the invention is to provide a novel visual display system wherein light is reflected from or transmitted through patterned materials and projected onto a display surface to create variegated and interesting visable patterns which are continuously changing and moving.

A still further object is the provision of an improved visual display system of simplified construction which may utilize a commercially available projector having patterned image producing plates mounted therein to facilitate changes in patterns.

A further object lies in the provision of an improved visual display system as described above, such system incorporating a laser light source to provide a new and different type of projected image.

According to this invention, there is provided a display system comprising a laser light source, patterned display material located in the beam of light from the laser and means for creating relative movement between the beam and the material so as to create distinctive and continuously changing aesthetic patterns on a display screen.

The above and further objects, the principles of the invention and the best modes in which I have contemplated applying such principles will more fully appear from the following description when read in connection with the accompanying drawings.

BRIEF DESCRIPTION OF THE DRAWINGS

FIG. 1 is a plan view of the visual display system of the invention;

FIG. 2 is a plan view of another embodiment of the invention;

FIG. 3 is an elevation view of the patterned generating disc of the embodiment of FIG. 2, and FIG. 4 is a plan view of another embodiment of the invention.

DESCRIPTION OF THE PREFERRED EMBODIMENTS

The operation of the visual display system of the invention may be understood with reference to FIG. 1 wherein a laser light source 11 is situated to project a narrow beam of light toward a mirror 12. The mirror 12 is constructed with an eccentric reflecting surface 13 and is rotated by means of the motor 14 through a suitable gearing system (not shown). The eccentricity of the reflecting surface 13 causes the laser light beam reflected therefrom to follow an approximately circular path as illustrated by the arrow in FIG. 1. A rectangular plate 16 of textured or patterned translucent material is situated in the path of the laser light reflected from mirror 12.

The plate 16 may be made of a variety of translucent materials having regular or irregular surface patterns. These patterns may be shaped in the form of ribs or pyramids and are of small dimension, approximately 15 ribs per inch of plate. These ribs present an undulating surface of hills and valleys through which the laser light passes. When the light passes through the translucent plate 16, the changing thickness of the plate in combination with the movement of the beam as a result of the eccentricity of the reflecting surface 13 refracts the light into a continuously changing and moving pattern.

The plates 16 may be supported in a commercially available projector 17 which may be used to successively move plates having different patterns into the beam either automatically or manually. A projecting lens 18 which may also be a part of a commercially available projector is positioned to image the light passing through the plate 16 onto a display screen 21 located at a suitable distance from the projector 17. Alternatively, the light passing through the plate 16 may be projected directly onto the screen 21 without passing through any intermediate optical elements. The motor 14 may be variable in speed to further allow for changing the visual effect on the screen 21.

In operation, referring to FIG. 1, the laser source 11 projects a light beam towards the eccentric surface 13 on the reflector 12. The narrow beam reflected from this surface is continuously moved in an approximately circular path, impinges on the pattern display plate 16 and is subsequently projected onto the screen 21 via the projecting lens 18. The laser light source 11 may also be mounted for continuous movement by mounting the laser on a support which is reciprocated in the direction shown by the arrows to the left of the laser 11 in FIG. 1. The laser 11 could also be moved in a circular path as indicated by the arrow directly in front of the laser 11 in FIG. 1.

A further embodiment of the display system of the invention is shown in FIG. 2 wherein a laser light source 31 projects a beam towards a reflecting disc 32. The disc may be driven by a variable speed motor 33 by a plurality of gears (not shown). The disc 32 is shown more clearly in FIG. 3 and consists of a reflective surface having a plurality of distinct patterns located in different sectors of the disc. The disc may be made from a piece of reflecting foil on which has been located a plurality of reflecting particles to form distinct patterns. As the disc 32 rotates the different patterns thereon are brought into a position transverse to the beam of light from the laser 31.

The continuously changing patterns reflected from the disc 32 are directed on a display screen 36 via a projecting system 34 which may include a lens 35, FIG. 2, or alternatively the reflected light from the disc may be projected directly onto the screen without the use of any intermediate optical elements.

A further embodiment of the visual display system of the invention is illustrated in FIG. 4 wherein a laser light generator 41 projects a beam of light towards a pattern generating display material comprising a rectangular plate 42. The plate 42 may be identical with the plate 16 described above in connection with FIG. 1. Motor means 43 are provided to reciprocally move the plate 42 as indicated by the arrows in FIG. 4. Light passing through the pattern material 42 is passed through a projecting system 48 including a lens 44 and is imaged onto a visual display surface such as a screen 46. The laser generator 41 may also be mounted from continuous reciprocal motion in the direction indicated by the arrows in FIG. 4. In operation, the combined motion of the plate 42 and the light source results in the production of a continuously changing and moving visual display on the viewing surface 46.

In the embodiments shown in FIGS. 1 through 4, the projecting lens system may be eliminated, in which case light passing through or being reflected from the pattern display material is projected directly onto the visual display surface.

The particular effect generated by the display system of the invention results from the relationship between the width or diameter of the beam generated by the laser and the width or extent of the patterns in the various display generating materials of the invention. For example, it is preferable to select a display generating material in which the pattern repeats itself approximately 15 times per inch of surface. In combination with this dimension of display material, it is preferable to employ a laser source producing a beam having a width or diameter of approximately one-eighth to one-fourth inches in the area of intersection with the surface of the pattern display material in each of the embodiments.

Each of the above discussed embodiments of the invention may be located within a compact housing or enclosure with the elements of the display system mounted therein in the relative positions shown in FIGS. 1, 2 and 4. When the system is housed in such an enclosure, the projection screens shown in FIG. 1, 2 and 4 are replaced by a rear projection screen, i.e., a screen composed of translucent material so that patterns projected thereon may be viewed from a position external to the enclosure. The preferred form of enclosure is a polygon with one wall of the polygon removed and the rear projection screen mounted in its place. The remainder of the walls of the enclosure are preferably opaque but need not be.

Having described this invention, what I claim is:

1. A visual display system comprising
   a laser source for generating a narrow beam of light,
   patterned display generating material mounted in a plane transverse to the path of said narrow beam from said laser source,
   means for continuously moving said beam of light relative to said patterned display generating material,
   a projection screen,
   projecting means including a lens for projecting images of said patterned display generating material upon said screen and further means for continuously moving said laser source.

2. The combination recited in claim 1 wherein said patterned display generating material is translucent and said beam passes therethrough, and said first mentioned means includes a reflector mounted in the optical path between said patterned display generating material and said source, said reflector having an eccentric reflecting surface and means for continuously rotating said reflector to cause said beam to traverse a circular path.

3. The combination recited in claim 2 wherein said means for continuously rotating said patterned display generating material comprises a variable speed motor.

4. The combination recited in claim 1 wherein said material is a light reflective disc and further including means for continuously rotating said material in a plane traverse to the path of said beam.

5. The combination recited in claim 4 wherein said disc contains a plurality of different patterns, said patterns being rotated successively into the path of said beam.

6. The combination recited in claim 4 wherein said means for continuously rotating said patterned display generating material comprises a variable speed motor.

7. A visual display system comprising
   a laser light source for generating a narrow beam of light,
   means for moving and continuously changing the direction of said beam,
   a reflector mounted in the path of said beam, said reflector including an eccentric reflecting surface,
   variable speed motor means for continuously rotating said reflector,
   a patterned translucent display generating rectangular plate, the pattern on said plate comprising a plurality of surface undulations,
   means for supporting said plate traverse to said beam and automatically moving said plate into said beam,
   a projection screen, and
   means including a lens for projecting light passing through said translucent material onto said screen,
   whereby light generated by said source in the form of a narrow beam is continuously moved across the surface of said pattern to create a constantly moving and changing visual display on said screen.

8. A visual display system comprising
   a continuously movable laser light source for generating a narrow beam of light,
   a patterned reflective disc mounted in the path of said beam, said disc having a plurality of different reflective patterns arranged in successive radial sectors thereof,
   motor means for continuously rotating said disc, and
   means for projecting the light reflected from said disc directly onto a display surface without passing through any intermediate optical elements,
   whereby continuously changing and moving patterns are produced on said surface.

9. The combination recited in claim 8 wherein said display system is housed within a compact enclosure and said display surface comprises a rear projection screen of translucent material whereby patterns projected thereon from within said enclosure may be viewed from a position external to said enclosure.

* * * * *